US011137294B2

(12) United States Patent
Spangler et al.

(10) Patent No.: US 11,137,294 B2
(45) Date of Patent: Oct. 5, 2021

(54) METHOD OF TEMPERATURE ERROR DETECTION

(71) Applicant: Rolls-Royce Corporation, Indianapolis, IN (US)

(72) Inventors: Brian Thomas Spangler, Avon, IN (US); John V. Watkin, Franklin, IN (US); Timothy C. Keeney, Zionsville, IN (US); Neil James Dunaway, New Palestine, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 638 days.

(21) Appl. No.: 15/901,383

(22) Filed: Feb. 21, 2018

(65) Prior Publication Data

US 2019/0257701 A1    Aug. 22, 2019

(51) Int. Cl.
| | | |
|---|---|---|
| *G01K 15/00* | (2006.01) | |
| *G01K 7/02* | (2021.01) | |
| *G01K 7/04* | (2006.01) | |
| *G01K 13/02* | (2021.01) | |
| *G01K 13/024* | (2021.01) | |

(52) U.S. Cl.
CPC .......... *G01K 15/007* (2013.01); *G01K 7/021* (2013.01); *G01K 7/04* (2013.01); *G01K 13/02* (2013.01); *G01K 13/024* (2021.01); *G01K 2205/04* (2013.01)

(58) Field of Classification Search
CPC .......... F02C 9/28; F01B 25/04; F02D 41/222; F01D 17/085; F05D 2270/52; F05D 2270/303

USPC ....... 374/4, 5, 179, 141, 148, 163, 208, 144, 374/166, 110
See application file for complete search history.

(56) References Cited

U.S. PATENT DOCUMENTS

| | | | |
|---|---|---|---|
| 3,955,359 A | 5/1976 | Yannone et al. | |
| 4,016,717 A | 4/1977 | Smith et al. | |
| 6,363,330 B1 | 5/2002 | Alag et al. | |
| 2009/0055070 A1 | 2/2009 | De et al. | |
| 2018/0348065 A1* | 12/2018 | Lamarre | F01D 17/085 |

FOREIGN PATENT DOCUMENTS

| | | |
|---|---|---|
| EP | 1 102 048 A1 | 5/2001 |
| KR | 10-1760203 B1 | 7/2017 |

OTHER PUBLICATIONS

Extended European Search Report, issued in European Application 19153005.4, dated Jul. 11, 2019, pp. 1-24, European Patent Office, Munich, Germany.

* cited by examiner

*Primary Examiner* — Lisa M Caputo
*Assistant Examiner* — Janice M Soto
(74) *Attorney, Agent, or Firm* — Crowell & Moring LLC

(57) ABSTRACT

Systems and methods are provided to detect a failed thermocouple. A temperature in a gas path of a gas turbine engine may be measured, where the temperature is based on a signal generated by a thermocouple during a startup of the gas turbine engine and/or during an idle period that immediately follows the startup, and the thermocouple protrudes into the gas path. A failure of the thermocouple may be detected if the temperature is determined to be less than a threshold temperature.

13 Claims, 5 Drawing Sheets

METHOD OF TEMPERATURE ERROR DETECTION

This invention was made with government support under contract N00019-15-0019, CDRL A004 awarded by the United States Navy. The government has certain rights in the invention.

TECHNICAL FIELD

This disclosure relates to thermocouples and, in particular, to thermocouples in gas turbine engines.

BACKGROUND

A thermocouple is an electrical device comprising two dissimilar electrical conductors that form electrical junctions, which are subjected to differing temperatures. For example, a first one of the two electrical conductors may include a first metal and a second one of the two electrical conductors may include a second metal that is different than the first metal. The two electrical conductors may be joined at a first junction at one end of the conductors. A second junction may exist at a second location. When there is a temperature difference between the first and second junctions, the gradient of voltage may be directly proportional to a gradient in temperature between the first and second junctions. In other words, the thermocouple produces a temperature-dependent voltage as a result of a thermoelectric effect, and this voltage may be interpreted to measure a temperature.

Thermocouples may fail. Detecting a thermocouple failure may be important. For example, a gas turbine engine may have a control system, which in order to properly control operation of the gas turbine engine, relies on temperature measurements obtained using thermocouples. Present approaches to detecting thermocouple failures suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Solutions to the technical problem of detecting thermocouple failures are described herein. By way of introductory example, a method is provided to detect a failed thermocouple. A temperature in a gas path of a gas turbine engine is measured, where the temperature is based on a signal generated by a thermocouple during a startup of the gas turbine engine and/or during an idle period that immediately follows the startup, and the thermocouple protrudes into the gas path. A failure of the thermocouple may be detected if the temperature is determined to be less than a threshold temperature.

Figure 1:
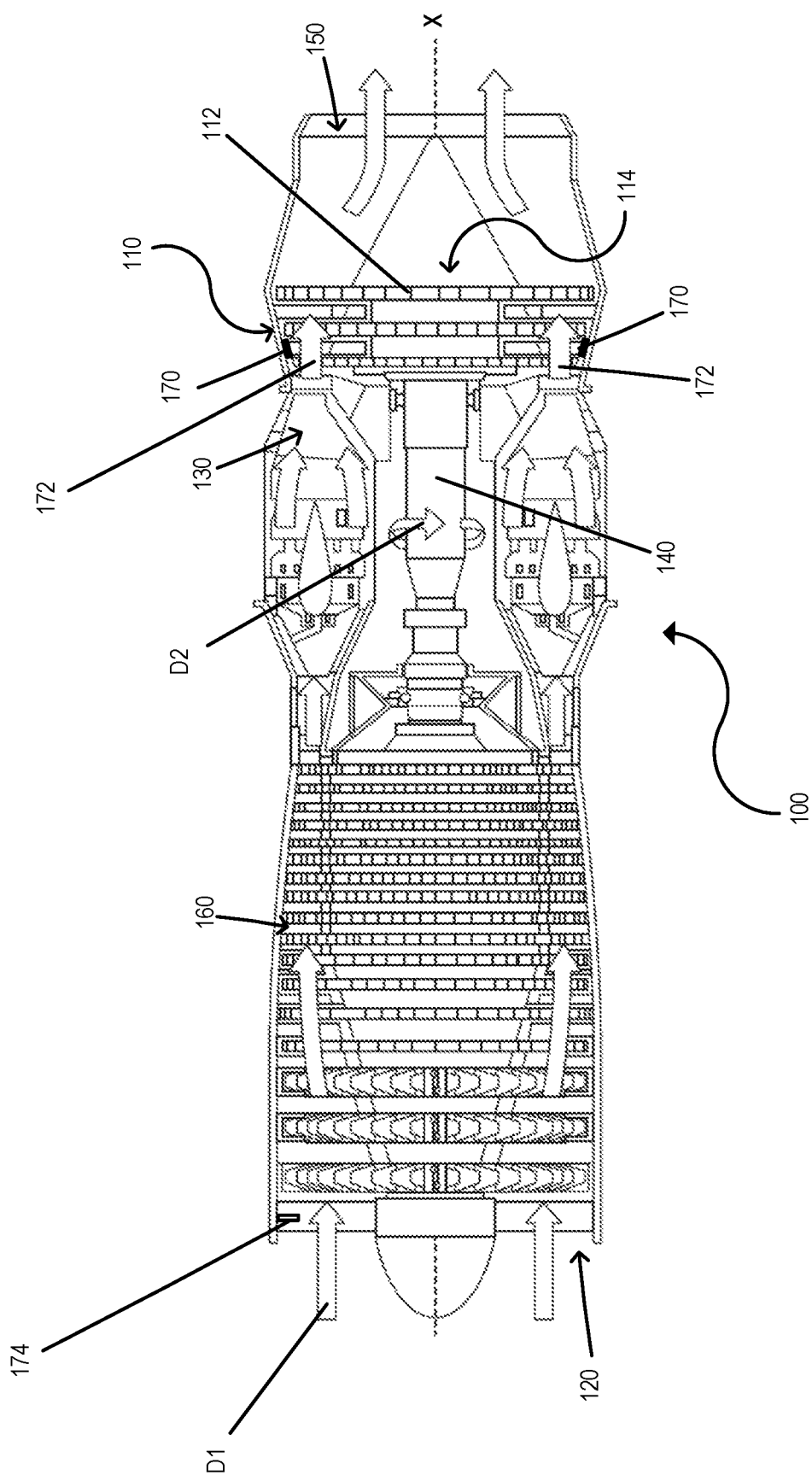
FIG. 1 is a cross-sectional view of a gas turbine engine that includes thermocouples.

FIG. 1 is a cross-sectional view of a gas turbine engine 100 that includes thermocouples 170. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. The thermocouples 170 in the illustrated example are located in the turbine section 110. In some examples, the thermocouples 170 are uniformly arranged around the circumference of the turbine section 110. Alternatively or in addition, the thermocouples 170 may be non-uniformly arranged around the circumference of the turbine section 110. Alternatively or in addition, the thermocouples 170 may be located in one or more locations in the gas turbine engine outside of the turbine section 110.

During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 following a gas path 172. The turbine section 110 extracts energy from the fluid flowing thorough the gas path 172 and causes a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples. The shaft 140 may drive the compressor section 160.

A temperature sensor 174 located at the intake section 120 may measure engine inlet temperature. The thermocouples 170 in the turbine section 110 may measure a temperature of the fluid in the gas path 172, which is known as engine measured gas temperature. In some examples, the thermocouples 170 may be located anywhere in the "hot section" of the gas turbine engine 100, which includes the turbine section 110 and anywhere aft of the turbine section 110 up to and including the exhaust section 150. Accordingly, the temperature of the fluid in the gas path 172 measured by the thermocouples 170 may include a temperature such as a burner outlet temperature (BOT) and an exhaust gas temperature (EGT).

Figure 2:
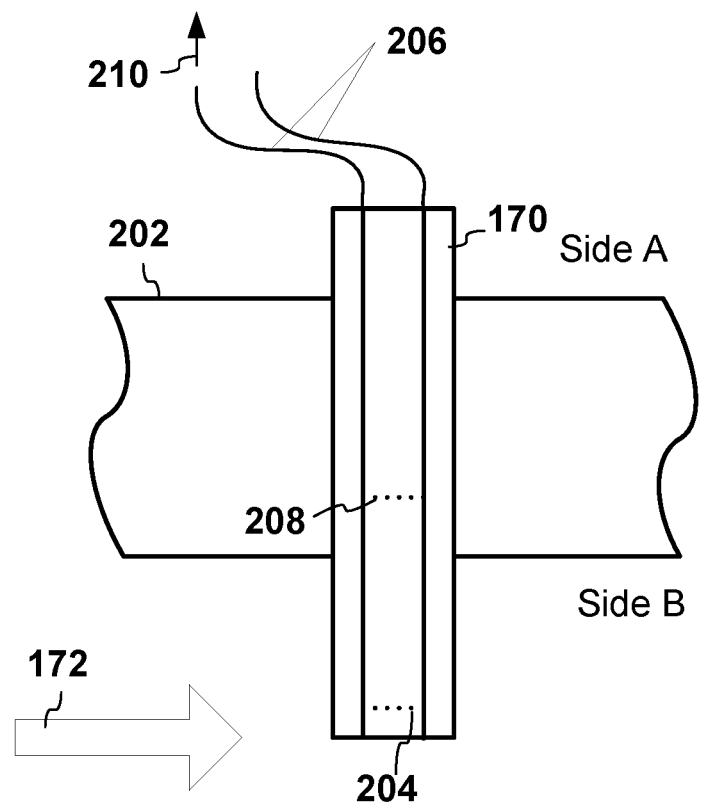
FIG. 2 is a cross-sectional view of a thermocouple.

FIG. 2 is a cross-sectional view of one of the thermocouples 170. The thermocouple 170 illustrated in FIG. 2 extends into an engine case 202 and protrudes into the gas path 172. In other words, the thermocouple 170 is immersed in the gas path 172. The temperature on a radially outward side (designated Side A) of the engine case 202 may be substantially cooler than the temperature of the fluid in the gas path 172 on the radially inward side (designated Side B) of the engine case 202.

A failure of the thermocouple 170 may include any type of deterioration in the accuracy of the thermocouple 170 and any complete failure of the thermocouple 170. Contaminants within the thermocouple 170 may create electrical shorts in some examples. The failure of the thermocouple 170 may involve a deterioration of a first junction 204 between two conductors 206 immersed in the gas path 172 but not in a second junction 208 located closer to or within the engine case 202. In such an example, when the gas turbine engine 100 is operating at a steady state, the failure of the thermocouple 170 may result in only, for example, a degree or two difference between an actual temperature of the fluid in the gas path 172 and a temperature detected based on a signal 210 generated by the thermocouple 170. As a result, such a failure may be very difficult to detect. To make such a failure even more difficult to detect, the thermocouples 170 are typically paired and/or connected together for redundancy. Such an arrangement may further hide a failure in one of the thermocouples 170. Nevertheless, the difference between the actual temperature and the temperature detected based on the signal 210 generated by the thermocouple 170 may be substantial and/or significant under conditions described below.

If the first junction 204 has deteriorated and the temperature of the fluid in the gas path 172 is increasing relatively quickly (or decreasing relatively quickly), then the relatively rapid change of the temperature of the fluid in the gas path 172 may not be detected by the thermocouple 170 because the first junction 204 is unable to responsively sense the rapidly changing temperature. However, if the temperature of the fluid in the gas path 172 stops rapidly changing and reaches a steady state, then the temperature at the second junction 208 eventually becomes substantially the same temperature as the fluid in the gas path 172 over time. After the temperature at the second junction 208 becomes substantially the same temperature as the fluid in the gas path, then the temperature detected based on the signal 210 from the thermocouple 170 becomes more accurate. In such a scenario, the temperature readings from the thermocouple 170 may lag the actual temperature of the fluid in the gas path 172.

During acceleration of the gas turbine engine 100, such as during takeoff of an aircraft, a control system may attempt to prevent the gas turbine engine 100 from overheating by limiting engine speed and/or the rate of the acceleration. However, the control system may rely on the engine measured gas temperature detected by the thermocouples 170 in order to properly limit the rate of the acceleration. If any of the thermocouples 170 fail in the manner just described, then the temperature readings from the thermocouple 170 may lag the actual temperature. Consequently, the control system may inadvertently allow a higher speed and/or more acceleration than is proper, and the temperature in the turbine section 110 (for example, the engine measured gas temperature) may become too hot. If the temperature in the turbine section 110 becomes too hot, then the blades 112 and/or other engine components may be destroyed or damaged by the excess heat.

To complicate matters, temperature measurements from the thermocouples 170 in the gas path 172 may vary dramatically during operation of the gas turbine engine 100 even when the thermocouples 170 are working properly. In many scenarios, the temperature may change abruptly from measurement to measurement. Because the temperature measurements can vary widely and change abruptly up and down, identifying any failure of the thermocouple 170 has traditionally been difficult.

As mentioned above, a thermocouple failure may damage the gas turbine engine 100 during some accelerations, such as during takeoff, for example. In contrast, a thermocouple failure is unlikely to cause any damage during a startup of the gas turbine engine 100 because the temperature in the turbine section 110 typically remains well within design parameters. Although no damage may occur from the failure of the thermocouple 170 during the startup, the temperatures in the turbine section 110 may be more predictable than during other activities that result in acceleration of the gas turbine engine 100. Accordingly, solutions to the technical problem of detecting thermocouple failures are described herein which leverage the increased predictability of temperatures during the startup of a gas turbine engine 100.

As is known in the art, the startup of the gas turbine engine 100 occurs when the speed of the gas turbine engine 100 accelerates from zero to an idle speed, such as a ground idle speed. The idle speed may be a predetermined speed for the engine 100 that is set by an electronic engine controller (EEC) or an engine control unit (ECU). During the startup, fuel in one or more combustors of the combustion section 130 may be introduced and be burned. At the beginning of the startup, no fuel is burned. At the end of the startup, fuel is being consumed and the speed of the gas turbine engine 100 reaches idle speed.

Figure 3:
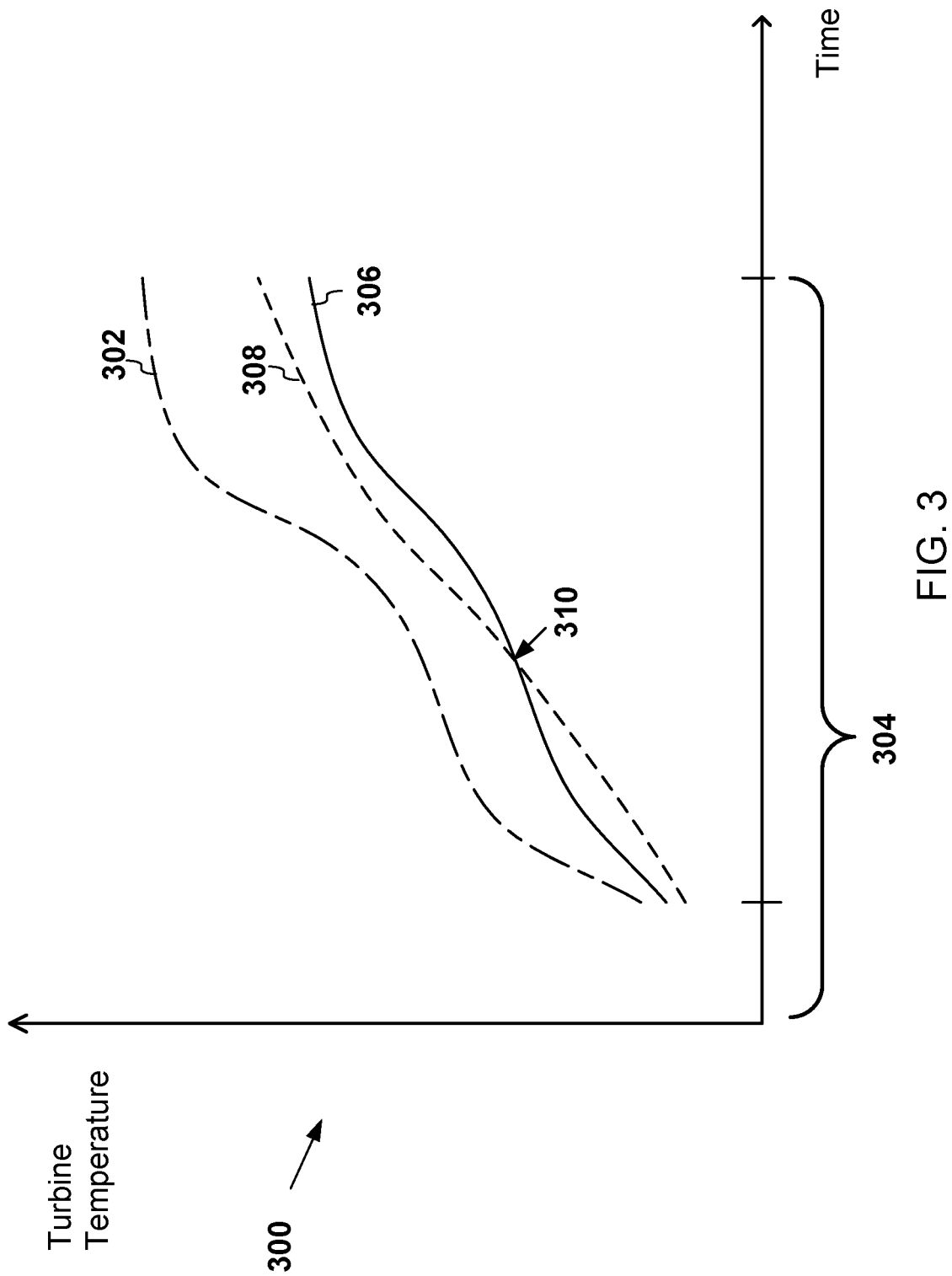
FIG. 3 is a graph of turbine temperature versus time as measured during a portion of a startup of a gas turbine engine.

FIG. 3 is a graph 300 of turbine temperature versus time as measured during a portion of the startup 304 of the gas turbine engine 100. The graph 300 includes a first curve 302 that illustrates an example of the turbine temperature as measured during a portion of the startup 304 when the thermocouple 170 is working properly. The graph 300 also includes a second curve 306 that illustrates an example of the turbine temperature as measured during a portion of the startup 304 when the thermocouple 170 has failed. The graph 300 also includes a threshold curve 308. The threshold curve 308 includes a threshold temperature for each corresponding time along the threshold curve 308. A failure of the thermocouple 170 may be detected if the measured turbine temperature falls below the threshold temperature at a corresponding point 310 on the threshold curve 308. In other words, if the measured turbine temperature starts to significantly lag the actual turbine temperature due to a failure of the thermocouple 170, then the measured temperature will at least temporarily be too low and fall below the threshold temperature at the corresponding point 310 on the threshold curve 308. Accordingly, the threshold curve 308 may also be referred to as a detection curve.

In some examples, the threshold temperature at each corresponding time on the threshold curve 308 may be a predetermined temperature that is based on multiple temperature measurements taken at that corresponding time by a working thermocouple during multiple engine startups or idle periods that immediately follow the multiple engine startups. For example, the predetermined temperature at a corresponding time on the threshold curve 308 may be a temperature selected to be lower than a lowest temperature detected by a working thermocouple at the corresponding time over multiple startups. The measurements used to derive the threshold curve 308 may be made on a test gas turbine engine that is the same or similar type as the gas turbine engine 100.

Alternatively or in addition, the threshold temperature at each corresponding time on the threshold curve 308 may be a predetermined temperature obtained from multiple temperature measurements taken by a working thermocouple during idle periods (not shown) that immediately follow the multiple engine startups. The threshold curve 308 during the idle period immediately following the engine startup may be useful because the measurements of the turbine temperature may initially still lag the actual turbine temperature during the idle period. The idle period is said to immediately follow the startup if the measurements of the turbine temperature still lag the actual turbine temperature as a result of the acceleration of the engine during the startup.

The curves 302, 306, and 308 shown in FIG. 3 are merely examples. The shapes of the curves 302, 306, and 308 may be different in other examples. Similarly, the values of the curves 302, 306, and 308 may be different in other examples.

Figure 4:
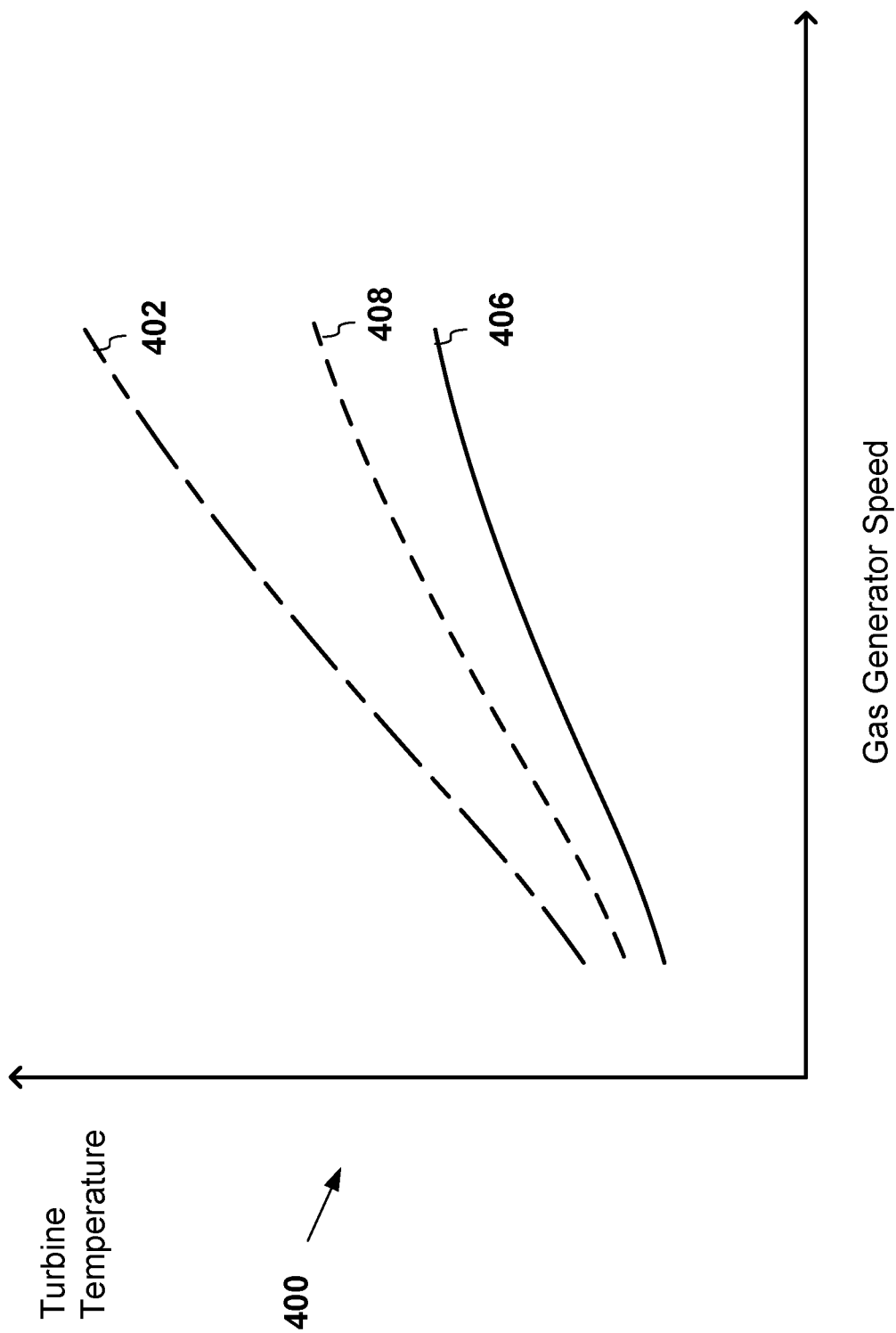
FIG. 4 is a graph of turbine temperature versus gas generator speed during a portion of a startup of a gas turbine engine.

FIG. 4 is a graph 400 of turbine temperature versus gas generator speed during a portion of the startup 304 of the gas turbine engine 100. The graph 400 includes a first curve 402 that illustrates an example of the turbine temperature as measured during a portion of the startup 304 when the thermocouple 170 is working properly. The graph 400 also includes a second curve 406 that illustrates an example of the turbine temperature as measured during a portion of the startup 304 when the thermocouple 170 has failed. In addition, the graph 400 includes a threshold curve 408. The threshold curve 408 includes a threshold temperature for each corresponding gas generator speed along the threshold curve 408. A failure of the thermocouple 170 may be detected in response to the measured turbine temperature being less than the threshold temperature at a corresponding gas generator speed on the threshold curve 408. In other words, if the measured turbine temperature starts to significantly lag the actual turbine temperature due to a failure of the thermocouple 170 as the gas generator speed increases, then the measured temperature will be lower than the actual temperature for the corresponding gas generator speed and be less than the threshold temperature at the corresponding point on the threshold curve 408. If the measured turbine temperature lags the actual turbine temperature due to a failure of the thermocouple 170 any point during the portion of the startup 304, then the measured turbine temperature may be lower than the temperature on the threshold curve 408 for one or more of the corresponding gas generator speeds as shown in the example in FIG. 4. In one such example, during a portion of the startup 304, the temperature may be sampled at 5 Hertz, over a 1 second sampling window of that portion of the startup 304, 5 points of data are obtained. The 5 points may be individually compared to the corresponding point on the threshold curve 408. Then all 5 points may be averaged. For example, two points may be below (a negative margin) the corresponding point on the threshold curve and three above (positive margin), but the average may be a negative margin, resulting in a determination that the thermocouple 170 has failed for that startup. Nevertheless, the thermocouple 170 may not be flagged as a failed thermocouple unless, for example, 5 starts have been evaluated and the average of those 5 starts in negative margin.

The curves 402, 406, and 408 shown in FIG. 4 are merely examples. The shapes of the curves 402, 406, and 408 may be different in other examples. Similarly, the values of the curves 402, 406, and 408 may be different in other examples.

The graphs 300 and 400 illustrate how to detect the failure of the thermocouple 170 by comparing turbine temperature to a corresponding temperature on the threshold curve 308 or 408. In other examples, the thermocouple 170 may be located in the gas path 172 of the gas turbine engine 100 but in a location outside of the turbine section 110. Accordingly, the temperature measured by the thermocouple 170 may be a temperature different than turbine temperature. Similarly, the threshold curve 308 or 408 may be determined from measurements taken at the location outside of the turbine section 110 over multiple startups of the gas turbine engine 100 and/or a test gas turbine engine.

The temperature measurements may correspond to time as shown in FIG. 3, to gas engine speed as shown in FIG. 4, or to any other variable that indicates the time elapsed since the beginning of the startup 304, that indicates the time elapsed since the end of startup 304, and/or an extent to which the startup 304 of the gas turbine engine 100 is complete. Examples of the variable may include engine torque, corrected gas generator speed, and corrected gas generator speed based engine percent power (NGC EPP). Similarly, the temperature measurements may include values indicative of temperature measurements, such as voltage readings, and/or a value derived from temperature measurements, such as measured gas temperature based engine percent power (MGT EPP).

Figure 5:
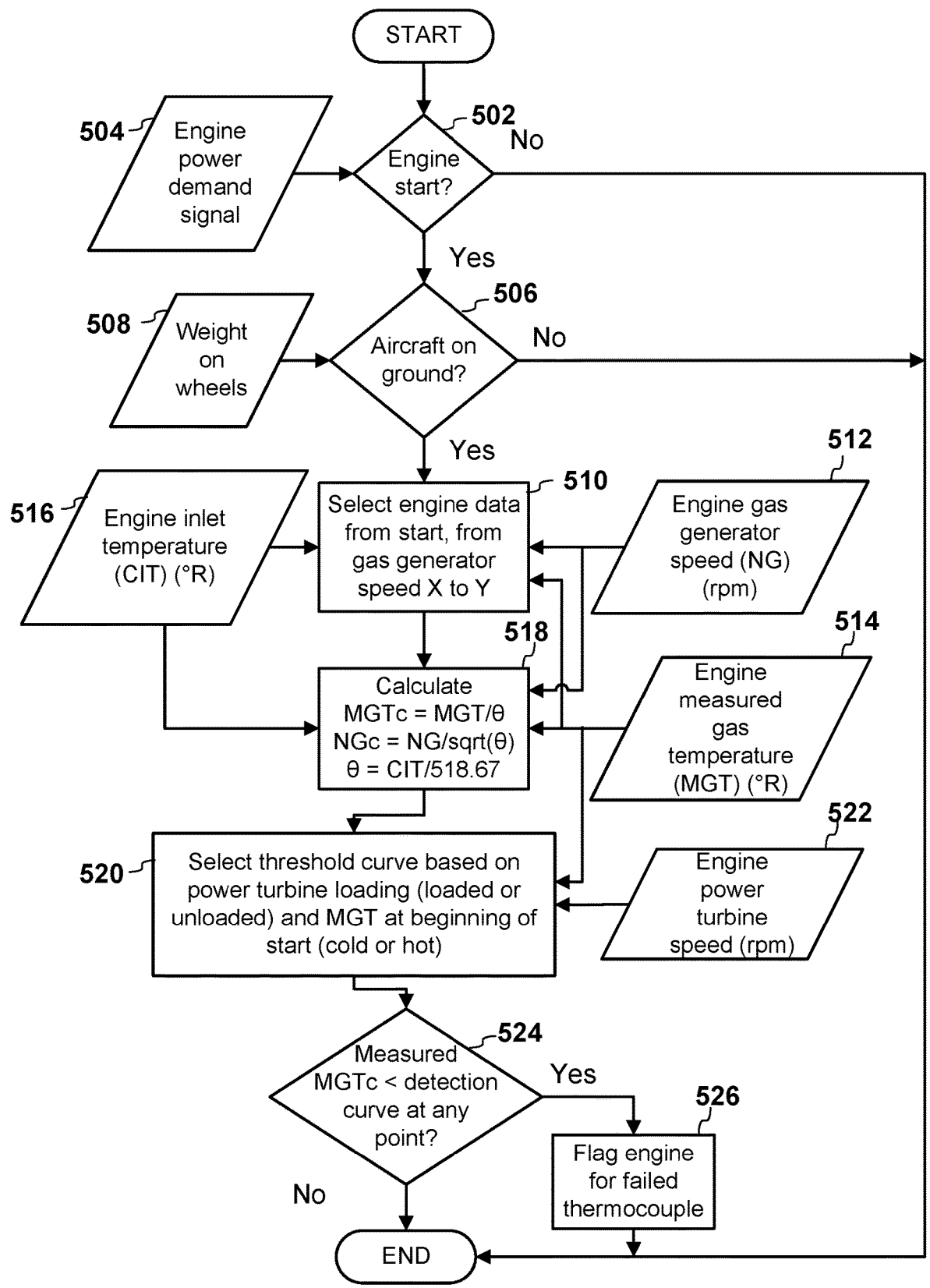
FIG. 5 illustrates a flow diagram of example logic of a system for detecting thermocouple failure.

FIG. 5 illustrates a flow diagram of example logic of a system for detecting thermocouple failure. Operations may begin by determining (502) if the startup 304 of the gas turbine engine 100 is beginning. The gas turbine engine 100 may be starting if an engine power demand signal 504 is detected by the system. Any other suitable mechanism for making such a determination is also contemplated. For example, the gas turbine engine 100 may be starting if the engine speed starts increasing from zero or substantially zero.

If the gas turbine engine 100 is not starting, then the operations may end. Alternatively, if the gas turbine engine 100 is starting, then operations may proceed by determining (506) if an aircraft that includes the gas turbine engine 100 is currently on the ground. For example, the aircraft may be considered on the ground if a signal 508 indicates that weight is on the wheels. Any suitable mechanism for making such a determination is also contemplated.

If the aircraft is not on the ground, then operations may end. Alternatively, if the aircraft is on the ground, then engine data may be collected (510) for at least a portion of the startup 304. For example, the engine data may be collected as the gas generator speed ranges from a first predetermined speed X to a second predetermined speed Y. In some examples, X may be zero or a non-zero value, and Y may be ground idle speed. Alternatively or in addition, the engine data may be collected for a predetermined time period, such as for a predetermined time period starting after an initial delay from when the startup was detected. Alternatively, the engine data may be collected until a failure of the thermocouple 170 is detected.

The engine data may include, for example, engine gas generator speed (NG) 512 in revolutions per minute or other units, engine measured gas temperature (MGT) 514 in degrees Rankine or other units (determined from one or more of the thermocouples 170), and engine inlet temperature (CIT) 516 (determined from temperature sensor 174 located at the intake section 120, for example).

The temperature and a corresponding variable may be calculated (518) from the engine data in order to compare with a point on the threshold curve 308 and 408. For example, MGTc, which is corrected engine measured gas temperature, may be the temperature and NGc, which is corrected gas generator speed may be the corresponding variable. MGTc and NGc may be calculated from each set of measurements in the engine data, as MGTc=MGT/θ, NGc=NG/sqrt(θ), and θ=CIT/518.67. Theta (θ) is the variable in this example that provides a "correction" (in other words, normalization) to MGT and NG to produce MGTc and NGc, respectively. By using the corrected or normalized temperatures and engine speeds, the engine data captured from a variety of ambient conditions may be compared as if the engine data were collected at a single, standard ambient condition. Nevertheless, in other examples, corrected or normalized engine data is not calculated and/or used.

The threshold curve 308 and 408 may be selected (520) from a set of threshold curves based on the power turbine loading and/or the temperature of gas turbine engine at the beginning of the startup 304. In one example, the set of threshold curves may include a threshold curve derived from tests run under each likely combination of load and/or temperature. As a result, the threshold curves selected may depend on, for example, whether the gas turbine engine 100 is loaded or unloaded and whether the engine temperature at the beginning of the startup 304 is hot or cold. In such a scenario, the set of threshold curves may include four threshold curves.

The gas turbine engine 100 may be "cold" if, for example, the MGT 514 is at the same temperature as ambient air around the gas turbine engine 100 or within a predetermined temperature delta of the ambient air temperature. In other words, the gas turbine engine 100 has been turned off long enough that the MGT 514 comes within the predetermined temperature delta of the ambient air temperature. Alternatively, the gas turbine engine 100 may be "hot" if the MGT 514 is above a predetermined temperature. For example, the gas turbine engine 100 may be "hot" if the engine had been operating for a while, was briefly turned off, and is now about to be started again. Accordingly, a determination of whether the gas turbine engine 100 is hot or cold at the beginning of the startup 304 may be based on the MGT 514.

The gas turbine engine 100 may be loaded if, for example, engine power turbine speed 522 in rotations per minute or other units is above a threshold level. Alternatively, the gas turbine engine 100 may be unloaded if, for example, the engine power turbine speed 522 is below the threshold level.

In other examples, the set of threshold curves may include threshold curves derived from tests run under any potential engine state that may affect the temperature in the gas path 172 during the startup 304. Accordingly, the threshold curve appropriate to the state of the gas turbine engine 100 (in other words, appropriate to engine state) at the beginning of the startup 304 may be selected (520) from the set of threshold curves based on the engine state. For example, the engine state at the beginning of the startup 304 may include any indication of initial temperature of the gas path 172. For example, the initial temperature may be determined by a comparison of an indicated inlet temperature vs an indicated turbine gas path temperature. The system may compare the two in order to determine which to select as the initial temperature. After the threshold curve 308 and 408 is selected (520) from the set of threshold curves, operations may proceed based on the threshold curve 308 and 408 that is selected. For example, the set of threshold curves may correspond to the altitude of the gas turbine engine 100.

A failure of the thermocouple 170 may be detected (524) in response to a determination that the measured temperature is less than the threshold temperature at a corresponding point on the threshold curve 308 and 408. For example, for each MGTc and NGc pair calculated, the corresponding threshold temperature may be the temperature on the threshold curve 308 and 408 at a point corresponding to the calculated NGc. If the MGTc is less than the threshold temperature from the threshold curve 308 and 408, then a failure of the thermocouple 170 may be detected. If the failure of the thermocouple 170 is detected, then a flag or status may be set (526) indicating that the gas turbine engine 100 be checked for a failed thermocouple.

Alternatively, if the measured temperature is greater than or equal to the threshold temperature across the entire threshold curve 308 and 408, then a failure of the thermocouple 170 may not be detected, and operations may end. Operations may end by, for example, checking for a subsequent startup of the gas turbine engine 100. In an alternative example, operations may end by taking no further actions.

The operations may include additional, different, or fewer operations than illustrated in FIG. 5. For example, the logic of the system for detecting thermocouple failure may include, of the operations shown in FIG. 5, only two operations: detecting (510) the temperature, such as the engine measured gas temperature 514, in the gas path 172 of the gas turbine engine 100, where the temperature is based on the signal 210 generated by the thermocouple 170 immersed in the gas path 172 during the startup 304 of the gas turbine engine 100 or during an idle period that immediately follows the startup 304; and detecting (524) a failure of the thermocouple 170 in response to determining the temperature is less than a threshold temperature.

In some examples, the measured temperature that is compared with the temperature threshold is an average of multiple temperature measurements taken over a moving window of time. For example, the temperature may be a five point moving average. The average may be any mathematical average such as the mean, the mode, or the median.

In the example shown in FIG. 5, the operations include determining (506) if an aircraft is currently on the ground. However, in other examples, the system may not make such a determination. Instead, the operations may include, for example, determining an altitude of the gas turbine engine 100 and then selecting the threshold curve 308 and 408 that matches the altitude. In still other examples, the gas turbine engine 100 may not be on an aircraft. For example, the gas turbine engine may be on some other vehicle, such as a boat, or not be in a vehicle at all.

The ability for the system to detect a thermocouple failure may be improved if the gas turbine engine 100 is not already at and/or near an operating temperature of the gas turbine engine 100. As a result, in some examples, the temperature may not be compared to the threshold temperature during the startup 304 if the temperature of the gas turbine engine 100 is, for example, at and/or near the operating temperature at the beginning of the startup 304.

Detecting a thermocouple failure does not necessarily require the threshold curve 308 and 408. For example, the threshold temperature may be a temperature at a selected time, a selected engine speed, or other selected variable. For example, the threshold temperature may be a threshold based on the lowest temperature detected immediately after the gas turbine engine 100 reaches ground idle speed or other idle speed after each startup conducted during a series of tests. The threshold temperature may be, for example, a fraction of the lowest temperature detected.

The operations may be executed in a different order than illustrated in FIG. 5. For example, the threshold curve may be selected (520) before the temperature and corresponding variable are calculated (518). As another example, the determination (506) that the aircraft is on the ground may be made before the determination (502) that the gas turbine engine 100 is starting.

The system for detecting thermocouple failure may include a processor configured to detect a measured temperature in the gas path 172 of the gas turbine engine 100, where the measured temperature is based on the signal 210 generated by the thermocouple 170 during the startup 304 of the gas turbine engine 100 and/or during an idle period that immediately follows the startup 304. The processor may be further configured to detect a failure of the thermocouple 170 in response to a determination that the measured temperature is less than a threshold temperature.

The system 100 may be implemented with additional, different, or fewer components. For example, the system 100 may include a memory. The memory may include computer executable instructions that are executable by the processor to perform the logic of the system or portions thereof that are described above. As another example, the system may include an analog to digital converter to process the signal 210 from the thermocouple 170. In some examples, the system includes the thermocouple 170.

The processor and the memory may be in communication with each other. The processor may be in communication with additional components, such as the analog to digital converter and/or the thermocouple 170 and/or the thermocouples 170. In some examples, the processor and/or memory may be included in an electronic engine controller (EEC) or an engine control unit (ECU). The processor may be in communication with a display device that may indicate to a human that, for example, the thermocouple has failed.

The processor may be any device that performs logic operations. The processor may include a general processor, a central processing unit, an application specific integrated circuit (ASIC), a digital signal processor, a field programmable gate array (FPGA), a digital circuit, an analog circuit, a controller, a microcontroller, any other type of processor, or any combination thereof. The processor may include one or more components operable to execute computer executable instructions or computer code embodied in the memory.

The system may be implemented in many different ways. The logic of the system may be implemented in one or more modules comprising hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory, for example, that comprises instructions executable with the processor or other processor to implement one or more of the features of the module. When any one of the modules includes the portion of the memory that comprises instructions executable with the processor, the module may or may not include the processor. In some examples, each module may just be the portion of the memory or other physical memory that comprises instructions executable with the processor or other processor to implement the logic of the corresponding module without the module including any other hardware.

Some features are described as stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action includes setting a Boolean variable to true and the second action is initiated if the Boolean variable is true.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A method to detect a failed thermocouple, the method comprising:
  measuring a temperature in a gas path of a gas turbine engine, the temperature based on a signal generated by a thermocouple during a startup of the gas turbine engine and/or during an idle period that immediately follows the startup, the thermocouple configured to protrude into the gas path; and
  detecting a failure of the thermocouple in response to determining the temperature is less than a threshold temperature.

2. The method of aspect 1 wherein the threshold temperature is a predetermined temperature obtained from multiple temperature measurements taken by a working thermocouple during multiple engine startups or idle periods that immediately follow the multiple engine startup.

3. The method of aspect 1 or 2, wherein the temperature measured in the gas path includes a corrected engine measured gas temperature and the thermocouple projects into the gas path of a turbine section of the gas turbine engine.

4. The method of any of aspects 1 to 3, wherein the measuring the temperature comprises determining the temperature as an average of multiple temperature measurements taken over time.

5. The method of any of aspects 1 to 4, wherein the measuring the temperature comprises measuring the temperature in the gas path over a time period during the startup of the gas turbine engine and/or during the idle period that immediately follows the startup, and wherein the detecting the failure of the thermocouple is in response to determining the temperature is less than the threshold temperature at a corresponding point on a threshold curve.

6. The method of aspect 5, wherein the corresponding point on the threshold curve is for a time in the time period that the temperature is measured.

7. The method of any of aspects 5 to 6, wherein the corresponding point on the threshold curve is for an engine speed at which the temperature is measured.

8. A computer readable storage medium comprising computer executable instructions, the computer executable instructions executable by a processor, the computer executable instructions comprising:
  instructions executable to detect a measured temperature in a gas path of a gas turbine engine, the measured temperature based on a signal generated by a thermocouple during a startup of the gas turbine engine and/or during an idle period that immediately follows the startup, the thermocouple arranged to protrude into the gas path; and
  instructions executable to detect a failure of the thermocouple in response to a determination that the measured temperature is less than a threshold temperature.

9. The computer readable storage medium of aspect 8, wherein the computer executable instructions comprise instructions executable to determine that the startup is beginning and, in response, collecting engine data during the startup of the gas turbine engine and/or during the idle period, wherein the engine data includes the measured temperature.

10. The computer readable storage medium of any of aspects 8 to 9, wherein the computer executable instructions comprise instructions executable to detect the measured temperature in the gas path over a time period during the startup of the gas turbine engine and/or during the idle period that immediately follows the startup, and instructions executable to detect the failure of the thermocouple in response to the determination that the measured temperature is less than the threshold temperature at a corresponding point on a threshold curve.

11. The computer readable storage medium of aspect 10, wherein the computer executable instructions comprise instructions executable to select the threshold curve from a set of threshold curves based on an engine state.

12. The computer readable storage medium of aspect 11, wherein the engine state includes an indication of load on the gas turbine engine.

13. The computer readable storage medium of aspect 11, wherein the engine state includes an indication of initial temperature of the gas path of the gas turbine engine.

14. The computer readable storage medium of any of aspects 8 to 13, wherein the measured temperature being less than the threshold temperature indicates that the measured temperature lags an actual temperature in the gas path.

15. A system comprising:
a processor configured to:
detect a measured temperature in a gas path of a gas turbine engine, the measured temperature based on a signal generated by a thermocouple during a startup of the gas turbine engine and/or during an idle period that immediately follows the startup, the thermocouple arranged to protrude into the gas path; and
detect a failure of the thermocouple in response to a determination that the measured temperature is less than a threshold temperature.

16. The system of aspect 15, wherein the threshold temperature is a predetermined temperature obtained from multiple temperature measurements taken by a working thermocouple during multiple engine startups or idle periods that immediately follow the multiple engine startup.

17. The system of any of aspects 15 to 16, wherein the measured temperature includes a corrected engine measured gas temperature and the thermocouple projects into the gas path of a turbine section of the gas turbine engine.

18. The system of any of aspects 15 to 17, wherein the processor is further configured to detect the measured temperature over a time period during the startup of the gas turbine engine and/or during the idle period that immediately follows the startup, and wherein the processor is configured to detect the failure of the thermocouple in response to the determination that the measured temperature is less than the threshold temperature at a corresponding point on a threshold curve.

19. The system of aspect 18, wherein the corresponding point on the threshold curve is for a time in the time period that the measured temperature is detected.

20. The system of aspect 18, wherein the corresponding point on the threshold curve is for an engine speed at which the measured temperature is detected.

What is claimed is:

1. A method to detect a failed thermocouple, the method comprising:
measuring a temperature in a gas path of a gas turbine engine, the temperature based on a signal generated by a thermocouple during a startup of the gas turbine engine, the thermocouple configured to protrude into the gas path, wherein the measuring the temperature comprises measuring the temperature in the gas path over a time period during the startup of the gas turbine engine before the gas turbine engine reaches idle speed;
detecting an engine speed over the time period during the startup of the gas turbine engine before the gas turbine engine reaches idle speed;
providing a threshold curve comprising a plurality of points, wherein each of the points includes a corresponding threshold temperature and a corresponding gas generator speed; and
detecting a failure of the thermocouple in response to determining the temperature that is measured is less than a threshold temperature at a corresponding point on a threshold curve, wherein the corresponding point on the threshold curve includes the threshold temperature and the engine speed at which the temperature is measured.

2. The method of claim 1 wherein the threshold temperature is a predetermined temperature obtained from multiple temperature measurements taken by a working thermocouple during multiple engine startups.

3. The method of claim 1, wherein the temperature measured in the gas path includes a corrected engine measured gas temperature and the thermocouple projects into the gas path of a turbine section of the gas turbine engine.

4. The method of claim 1, wherein the measuring the temperature comprises determining the temperature as an average of multiple temperature measurements taken over time.

5. A non-transitory computer readable storage medium comprising computer executable instructions, the computer executable instructions executable by a processor, the computer executable instructions comprising:
instructions executable to detect a measured temperature in a gas path of a gas turbine engine, the measured temperature based on a signal generated by a thermocouple during a startup of the gas turbine engine before the gas turbine engine reaches idle speed, the thermocouple arranged to protrude into the gas path;
instructions executable to detect an engine speed during the startup of the gas turbine engine before the gas turbine engine reaches idle speed;
instructions executable to provide a threshold curve comprising a plurality of points, wherein each of the points includes a corresponding threshold temperature and a corresponding gas generator speed; and
instructions executable to detect a failure of the thermocouple in response to a determination that the measured temperature is less than a threshold temperature at a corresponding point on a threshold curve, wherein the corresponding point on the threshold curve includes the threshold temperature and the engine speed at which the measured temperature is measured.

6. The computer readable storage medium of claim 5, wherein the computer executable instructions comprise instructions executable to determine that the startup is beginning and, in response, collecting engine data during the startup of the gas turbine engine, wherein the engine data includes the measured temperature.

7. The computer readable storage medium of claim 5, wherein the computer executable instructions comprise instructions executable to select the threshold curve from a set of threshold curves based on an engine state.

8. The computer readable storage medium of claim 7, wherein the engine state includes an indication of load on the gas turbine engine.

9. The computer readable storage medium of claim 7, wherein the engine state includes an indication of initial temperature of the gas path of the gas turbine engine.

10. The computer readable storage medium of claim 5, wherein the measured temperature being less than the threshold temperature indicates that the measured temperature lags an actual temperature in the gas path.

11. A system comprising:
a processor configured to:
detect a measured temperature in a gas path of a gas turbine engine, the measured temperature based on a signal generated by a thermocouple during a startup of the gas turbine engine before the gas turbine engine reaches idle speed, the thermocouple arranged to protrude into the gas path;
detect an engine speed during the startup of the gas turbine engine before the gas turbine engine reaches idle speed;

provide a threshold curve comprising a plurality of points, wherein each of the points includes a corresponding threshold temperature and a corresponding gas generator speed; and detect a failure of the thermocouple in response to a determination that the measured temperature is less than a threshold temperature at a corresponding point on a threshold curve, wherein the corresponding point on the threshold curve includes the threshold temperature and the engine speed at which the measured temperature is measured.

12. The system of claim 11, wherein the threshold temperature is a predetermined temperature obtained from multiple temperature measurements taken by a working thermocouple during multiple engine startups.

13. The system of claim 11, wherein the measured temperature includes a corrected engine measured gas temperature and the thermocouple projects into the gas path of a turbine section of the gas turbine engine.

\* \* \* \* \*